United States Patent [19]
Suzuki

[11] Patent Number: 5,223,922
[45] Date of Patent: Jun. 29, 1993

[54] COLOR PICTURE IMAGE READING DEVICE WITH COLOR CORRECTION FUNCTION

[75] Inventor: Masahiro Suzuki, Tokyo, Japan
[73] Assignee: Seiko Instruments Inc., Japan
[21] Appl. No.: 958,480
[22] Filed: Oct. 8, 1992

Related U.S. Application Data

[63] Continuation of Ser. No. 873,604, Apr. 22, 1992, abandoned, which is a continuation of Ser. No. 537,356, Jun. 13, 1990, abandoned.

[51] Int. Cl.$^5$ .............................................. H04N 1/46
[52] U.S. Cl. ........................................... 358/75; 358/80
[58] Field of Search ............... 358/75, 80, 213.11, 358/482, 483; 382/65, 67, 68; 250/78

[56] References Cited

U.S. PATENT DOCUMENTS

| | | | |
|---|---|---|---|
| 4,481,532 | 11/1984 | Clark et al. | 358/80 |
| 4,740,833 | 4/1988 | Shiota et al. | 358/80 |
| 4,870,483 | 9/1989 | Nishigaki et al. | 358/75 |
| 4,891,692 | 1/1990 | Outa | 358/80 |
| 4,926,251 | 5/1990 | Sekizawa et al. | 358/80 |
| 4,954,888 | 9/1990 | Fogaroli et al. | 358/80 |
| 4,992,863 | 2/1991 | Moriya | 358/80 |

FOREIGN PATENT DOCUMENTS 0266186 5/1988 European Pat. Off. .
0321983 6/1989 European Pat. Off. .

*Primary Examiner*—Jose L. Couso
*Attorney, Agent, or Firm*—Bruce L. Adams; Van C. Wilks

[57] ABSTRACT

A color picture reading device has a color image sensor composed of a plural number of sensor chips arranged in series. The color image sensor is connectable to one of a plurality of different output devices to reproduce a color picture image. The color picture reading device has a first memory for storing compensation coefficients corresponding to the respective sensor chips, a second member for storing other correction coefficients corresponding to the respective output device, an arithmetic circuit for calculating totalized color correction coefficients from the contents of the first and second memories, and a correction circuit for compensating both the discrepancy in color characteristics between the individual sensor chips and the different color characteristics between respective output devices by using the calculated totalized color correction coefficients.

18 Claims, 1 Drawing Sheet

COLOR PICTURE IMAGE READING DEVICE WITH COLOR CORRECTION FUNCTION

This is a continuation application of application Ser. No. 873,604 filed Apr. 22, 1992 which is a continuation application of application Ser. No. 537,356 filed Jun. 13, 1990, both now abandoned.

BACKGROUND OF THE INVENTION

The present invention relates to a color picture image reading device. More particularly, the present invention relates to a color picture image reading device for applying color correction processing to color image data obtained by a color image sensor which includes a plurality of color image sensor chips disposed on a chip with color filters and connected in series.

A color picture image reading device is, in general, composed of a picture image reader for reading out a picture image in analog form and outputting analog R,G,B signals, having a light source and an image sensor, a digital processor for converting the R,G,B signals into R,G,B digital data, and a correction means for applying required correction to the R,G,B digital data.

An image sensor for optically reading out an original picture image information is required to have a certain degree of length relative to a main scanning direction of reading out. For example, in order to read out an original picture image written on a paper of A 4 size in a closely adhered type image sensor, at least a length of 210 mm for the shorter width of the A 4 size is necessary. However, it is difficult to prepare an image sensor having such a length in one chip, and therefore the cost is high. Therefore, there is used such a method as shown in FIG. 2, in which a plural number of chips of image sensors which are each shorter than the total required length are connected in series, and used as a single image sensor.

Conventionally when an image sensor constituted of a plural number of sensor chips as described above is used, there is generally a discrepancy in color characteristics between the sensor chips. Particularly, when a sensor chip on-chipped with a color filter is used, a discrepancy in the spectroscopic transparency characteristics of the color filters, results. Thus if a uniform manuscript, without pattern or the like, has been read out, discrepancy is generated in color picture image signals between the chips, even when shading compensation is applied thereto. Consequentially, when the color picture image is reproduced using the color picture image signals as they are, discrepancy is generated in the color picture element data in correspondence to the color characteristics of the chips read out, with the result that, a smooth reproduced picture image can not be obtained. Therefore, in order to correct the discrepancy in color characteristics of a plural number of sensors chips, color correction corresponding to each respective chips is necessary. The color picture element data are in general composed of three data, that is R,G,B data and the correction coefficients used in the color correction to the color picture element data forms a 3×3 correction matrix. The color correction is carried out by the multiplication between the R,G,B data and the correction matrix.

On the other hand, the conventional color image reading device assumes in general that the color image can be reproduced by various output devices (CRT, color printer, etc.) by being connected to these devices. In such a situation, for the output device (such as a CRT, color printer, etc.), since the color characteristics are different for each particular output device, color correction specific to the respective output device is also necessary. This type of color correction is carried out in the same way that the color correction of the discrepancy in the color characteristics between the sensor chips is carried out.

As described above, when the discrepancy of the color characteristics between the sensor chips and the difference of the color characteristics of a respective output device are intended to be corrected, the combinations thereof become very abundant. For example, when it is assumed that the number of sensor chips constituting one line sensor is m pieces, and the kinds of the output devices are n kinds, then, when the correction is to be carried out with color correction coefficients corresponding to all of these, the number of combinations necessary for the color correction becomes m×n. The resulting number of correction coefficients becomes m×n×9 owing to the fact that each correction requires 9 coefficients. Conventionally when all of these color correction coefficients are to be memorized, a vast number of memories are required, and the expense for determining the color correction coefficient therefore increases.

SUMMARY OF THE INVENTION

It is therefore an object of the invention to provide a color picture image reading device employing a small number of memories for storing correction coefficients. The color correction coefficients are stored which corresponds to the discrepancy of the color characteristic between chips and the color characteristics of various kinds of color picture image output devices. The stored correction coefficients are applicable to the color data signals to reproduce the color picture image.

In accordance with the present invention, a first correction memory means for storing the chip corresponding color correction coefficients and a second correction memory means for storing the output device corresponding color correction coefficients are provided individually, and the color correction coefficients corresponded to the discrepancy of the color characteristics between chips and to the difference of color characteristics of various color picture image devices are provided separately and memorized, and after setting the kinds of the color picture image output devices, the totalized color correction coefficients are calculated by an arithmetic means. The correction coefficients are memorized in third correction memory means, and the color correction is carried out on the basis of the calculated color correction coefficients by use of a correction means.

When the device is constituted in such a manner as described above, it is not necessary to provide all of the color correction coefficients of m×n sets for the combination of the sensor chip number n and the number of kinds m of output devices. The color correction coefficients for respective elements are separately memorized, so that the sets of the color correction coefficients becomes m+n. The result is that the volume of the correction memory may be small, and the expense for determining the color correction coefficients becomes less. Thus, the color correction corresponding to the discrepancy of the color characteristics between chips and the color characteristics of various kinds of color picture image output devices can be applied to the color data signals to reproduce the color picture image on the output devices.

DETAILED DESCRIPTION OF THE PREFERRED EMBODIMENTS

In the following, an embodiment to the present invention will be explained on the basis of drawings.

Figure 1:
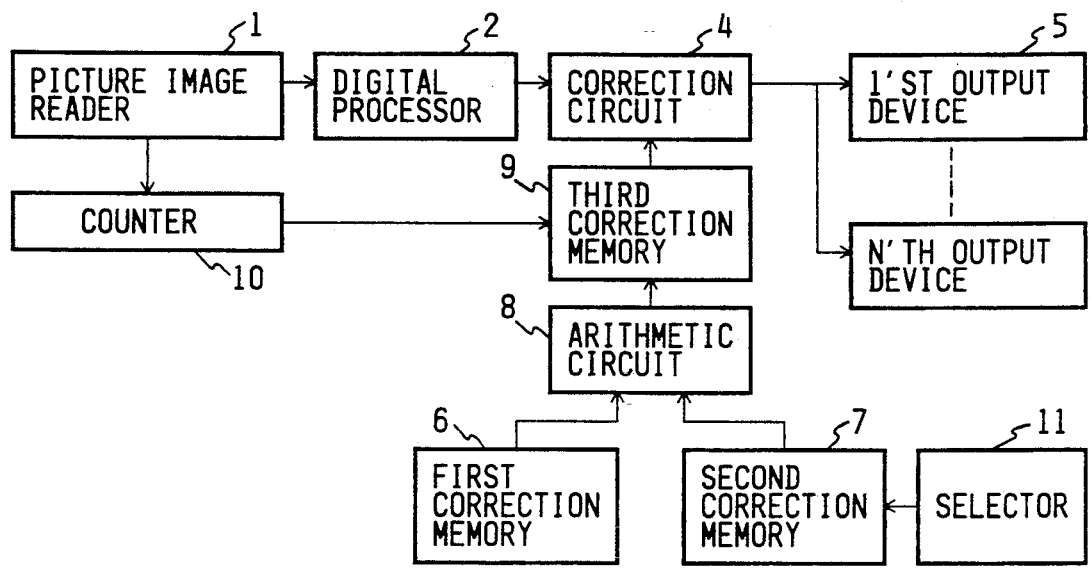
FIG. 1 is a block diagram for showing an embodiment of a color picture image reading device of the present invention.
Figure 2:
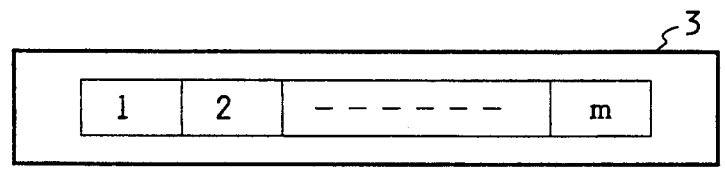
FIG. 2 is a plane diagram of an image sensor constitute of a plural number of chips.

FIG. 1 is a constitutional block diagram for showing an embodiment of the color picture image reading device of the present invention. Color picture image signals read by a picture image reader 1 comprising a light source, focusing system color image sensor 3 (shown in FIG. 2) are transformed into color picture element data via a digital processor 2 comprising an A/D converter and shading compensation means. Here, the image sensor 3 is constituted of m pieces of sensor chips as shown in FIG. 2. Each sensor chip has a predetermined number of sensing elements corresponding to the picture element.

The color picture element data effect the color correction arithmetic performed by a color correction circuit 4 having an adder and a multiplier, and the color compensated color picture element data are outputted from one of the output devices 5 of n kinds. On the other hand, in a first correction memory 6 m sets of first color correction coefficients A are memorized and correspond to respective chips, and in a second correction memory 7 n sets of second color correction coefficients K, which are effective to match the color picture image data to the output devices, are memorized and correspond to the respective output devices and have as address the coded number of the output device.

At first, one of the output devices 5 for outputting color images is selected via selector 11 by a manual operation. The selector may alternatively have a detection circuit for detecting which output device is connected. Here, it is assumed that the Kth output device has been selected among the n members of existing devices. The selector outputs signals representing that the Kth output device has been selected.

Next, all correction coefficients of m sets $A_a$ (a=1 to m) are outputted from the first correction memory circuit and the Kth correction coefficient set $K_k$ are outputted from the second correction memory circuit means by receiving the signals from the selector as address. Among two kinds of color correction coefficient matrix A and K, $A_a$ (a=1 to m) are multiplied with $K_k$ to make the product $C_{ka}=K_k A_a$ (a=1 to m) with the arithmetic circuit 8, and the results are memorized in a third correction memory circuit 9 under the chip number (1 to m) as address. Although the arithmetic circuit 8 can be constituted with a logic circuit such as an adder and a multiplier, softwear may be used. Also, the color correction coefficient K does not depend on the sensor chip, as has been hitherto done, and is possible to be treated as a value specific to the respective output device.

Next, reading out of a color manuscript is started. The color manuscript is sequentially read out with the color picture image reader 1 from the left end to the right end by one sensing element, and color picture image signals are sequentially transformed into digital color picture element data via digital processor 2. On the other hand, pulse signals representing the output of the picture elements from the color image reader 1 are detected by detecting means including a counter 10 and are counted by the detecting means. The counter 10 determines the sensor chip being in state and generating a color picture image signal, output by dividing the counted value by the number of the sensing element in one chip and outputs the sensor chip number in output to the third correction memory circuit. The third correction memory circuit outputs one set of the totalized color correction coefficients $C_{ka}$, corresponding to the inputted sensor chip number, to a correction circuit using the sensor chip number as address. The color picture element data are subjected to color correction by the correction circuit 4 by use of the inputted totalized color correction coefficient $C_{ka}$ from the third correction memory circuit 9 corresponding to the sensor chips read out, and outputted to the Kth output device.

Figure 3:
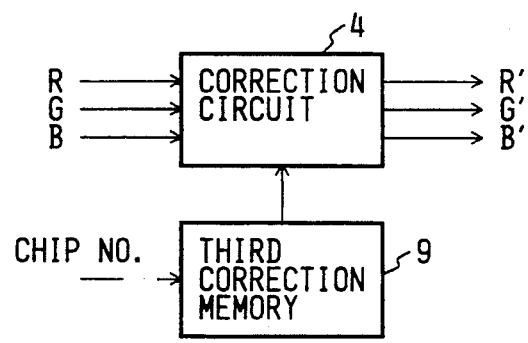
FIG. 3 is a block diagram showing an embodiment of the color correction means for carrying out the color correction of the present invention.

FIG. 3 is a block diagram showing an embodiment of the color correction circuit for carrying out the color correction arithmetic of the present invention. The correction circuit 4, as in the equation of the color correction arithmetic shown in the formula (1), performs matrix arithmetic on the color picture image data R, G and B, and the color correction coefficients $C_{11}$ to $C_{33}$. The correction circuit 4 can comprise a conventional product and sum arithmetic device. Also, in the color correction coefficients, the value differs in dependence to the sensor chips.

$$\begin{pmatrix} R' \\ G' \\ B' \end{pmatrix} = \begin{pmatrix} C_{11} & C_{12} & C_{13} \\ C_{21} & C_{22} & C_{23} \\ C_{31} & C_{32} & C_{33} \end{pmatrix} \begin{pmatrix} R \\ G \\ B \end{pmatrix} \qquad (1)$$

The color corrected R,G,B signals are outputted to the color picture image output device 5. The R, G, B signals may be the other kinds of color signals, and in such a case, it is needless to say that the color correction arithmetic of another type may be applied thereto. Also, the color correction coefficients may be other than the 3×3 as in equation (1), but may be multiplied to a higher order. Further, in the embodiment shown in FIG. 1, although explanation has been given on such an example in which the RGB signals are directly outputted to the output device, the color corrected RGB signals may alternatively be outputted, for example, to a memory device of a computer.

As explained above, according to the present invention, a small capacity memory may be used for memorize the color correction coefficient. Furthermore, it is not necessary to store the correction coefficients corresponding to respective chips for each particular device.

What is claimed is:

1. A color picture image reading device for reading a color picture image and outputting picture image data to a selected one of different color picture image output devices to reproduce the color picture image, comprising:

reading means for reading a picture image and outputting color picture image signals representing the picture image, the reading means having a plurality of sensor chips arranged in series;

digital converting means for converting the picture image signals to digital data;

first memory means for storing first color correction coefficients which correspond to respective ones of the sensor chips for correcting discrepancies in color characteristics between the sensor chips;

second memory means for storing second color correction coefficients which correspond to the different color picture image output devices for matching the color picture image data to the different color picture image output devices;

arithmetic means for calculating totalized color correction coefficients from the first and second color correction coefficients;

third memory means for storing the arithmetic results calculated by the arithmetic means; and color correction means for applying correction to the digital data having outputting means for outputting compensated digital data.

2. A color picture image reading device according to claim 1; further comprising selecting means for selecting one of the output devices.

3. A color picture image reading device according to claim 2; wherein said second memory means includes outputting means for outputting correction coefficients corresponding to the output device selected by said selecting means.

4. A color picture image reading device according to claim 1; further comprising detecting means for detecting when each sensor chip of the plurality of sensor chips is in an output state.

5. A color picture image reading device according to claim 4; wherein said third memory means includes outputting for outputting correction coefficients corresponding to the sensor chip of the plurality of sensor chips being in the output state.

6. A color picture image reading device according to claim 4; wherein said detecting means includes counting means for counting the number of outputted picture image signals and producing a counting value.

7. A color picture image reading device according to claim 6; wherein each sensor chip has a same number of sensing elements, and said detecting means further includes dividing means for dividing the counting value by the number of the sensing elements in one sensor chip.

8. A color picture image reading device according to claim 1; wherein said arithmetic means includes adder means and multiplier means.

9. A color picture image reading device for reading a color image and outputting picture image data to one of a plurality of different output devices, comprising: reading means including a plurality of sensor chips for reading a color picture image and generating picture image signals; first memory means for storing first color correction coefficients corresponding to respective ones of the sensor chips, said first color correction coefficients being effective to correct for discrepancies in color characteristics between the sensor chips; second memory means for storing second color correction coefficients corresponding to different output devices, said second color correction coefficients being effective to match the color picture image data to each of a plurality of different output devices; arithmetic means receptive of the first and second correction coefficients for calculating therefrom totalized color correction coefficients, the totalized color correction coefficients corresponding to a selected one of the output devices; and third memory means for storing the totalized color correction coefficients.

10. A color picture image reading device according to claim 9; further comprising digital converting means for converting the picture image signals into digital data.

11. A color picture image reading device according to claim 11; further comprising color correction performing means receptive of the totalized color correction coefficients and the digital data for performing color correction to the digital data.

12. A color picture image reading device according to claim 11; wherein said color correction performing means includes adder means and multiplier means.

13. A color picture image reading device according to claim 9; further comprising selecting means for selecting the selected output device.

14. A color picture image reading device according to claim 9; further comprising detecting means for detecting when each of the sensor chips is generating a picture image signal.

15. A color picture image reading device according to claim 14; wherein the third memory means includes outputting means coacting with the detecting means for outputting correction coefficients corresponding to a detected sensor chip that is generating a picture image signal.

16. A color picture image reading device according to claim 14; wherein the detecting means includes counting means for counting the number of the outputted picture image signals and producing a corresponding count value.

17. A color picture image reading device according to claim 16; wherein each sensor chip has the same number of sensing elements, and the detecting means further includes dividing means for dividing the count value by the number of sensing elements in each sensor chip.

18. A color picture image reading device for reading a color picture image and outputting picture image data to one of a plurality of different output devices, comprising: reading means including a plurality of sensor chips for reading a picture image and generating picture image signals; digital converting means for converting the picture image signals to digital data; selecting means for selecting one of a plurality of different output devices; first memory means for storing first color correction coefficients corresponding to respective ones of the sensor chips, said first color correction coefficients being effective to correct for discrepancies in color characteristics between the sensor chips; second memory means for storing second color correction coefficients corresponding to different output devices, said second color correction coefficients being effective to match the color picture image data to each of the plurality of different output devices, the second memory means including outputting means for outputting color correction coefficients corresponding to a selected output device; arithmetic means receptive of the first and second color correction coefficient for calculating therefrom totalized color correction coefficients; third memory means for storing the totalized color correction coefficients; and color correction means receptive of the digital data and the totalized color correction coefficients for applying correction to the digital data and having outputting means for outputting compensated digital data.

* * * * *